United States Patent
Zhou

(10) Patent No.: US 7,996,721 B2
(45) Date of Patent: Aug. 9, 2011

(54) METHOD AND SYSTEM FOR A PROCESS MONITOR USING A HARDWARE COMMUNICATION FORMAT

(75) Inventor: Hao Zhou, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 1044 days.

(21) Appl. No.: 10/554,662

(22) PCT Filed: Apr. 27, 2005

(86) PCT No.: PCT/CN2005/000579
§ 371 (c)(1),
(2), (4) Date: Oct. 26, 2005

(87) PCT Pub. No.: WO2006/114020
PCT Pub. Date: Nov. 2, 2006

(65) Prior Publication Data
US 2008/0189579 A1 Aug. 7, 2008

(51) Int. Cl.
*G06F 11/00* (2006.01)
(52) U.S. Cl. ............... 714/38.1; 714/15; 714/37
(58) Field of Classification Search .......... 714/38, 714/37, 15
See application file for complete search history.

(56) References Cited

U.S. PATENT DOCUMENTS

| | | | |
|---|---|---|---|
| 5,319,645 A * | 6/1994 | Bassi et al. ............ | 714/38 |
| 5,633,931 A | 5/1997 | Wright | |
| 5,715,393 A * | 2/1998 | Naugle ............... | 709/224 |
| 5,919,258 A * | 7/1999 | Kayashima et al. ...... | 726/23 |
| 6,074,345 A * | 6/2000 | van Oostrom et al. ..... | 600/300 |
| 6,732,359 B1 * | 5/2004 | Kirkpatrick et al. ....... | 718/102 |
| 6,813,698 B2 * | 11/2004 | Gallo et al. ............. | 711/170 |
| 6,847,316 B1 * | 1/2005 | Keller .................. | 341/106 |
| 6,892,332 B1 * | 5/2005 | Gulick ................. | 714/55 |
| 7,000,150 B1 * | 2/2006 | Zunino et al. ........... | 714/38 |
| 7,240,234 B2 * | 7/2007 | Morita et al. ............ | 714/4 |
| 7,363,486 B2 * | 4/2008 | Audebert et al. ......... | 713/150 |
| 7,797,702 B1 * | 9/2010 | Ferrie ................... | 718/101 |
| 2001/0037450 A1 * | 11/2001 | Metlitski et al. .......... | 713/152 |
| 2001/0047406 A1 * | 11/2001 | Araujo et al. ............ | 709/223 |

(Continued)

FOREIGN PATENT DOCUMENTS

WO WO-9951056 10/1999

OTHER PUBLICATIONS

PCT Search Report and publication for PCT Patent Application No. PCT/CN2005/000579 (Publication No. WO 2006/114020) mailed Jan. 5, 2006, 23pgs.

(Continued)

*Primary Examiner* — Scott T Baderman
*Assistant Examiner* — Loan Truong
(74) *Attorney, Agent, or Firm* — Blakely, Sokoloff, Taylor & Zafman LLP

(57) ABSTRACT

A method and system for a process monitor using a hardware communication format is described. The system includes a process monitor and a hardware device to send and/or receive messages in a hardware communication format to a management server. Hardware communication formatted messages are sent to a management server when an unexpected event occurs with the processes running on the system. The management server may respond with a command to perform an action on the system.

16 Claims, 5 Drawing Sheets

U.S. PATENT DOCUMENTS

| | | | |
|---|---|---|---|
| 2002/0040251 A1* | 4/2002 | Ogushi et al. | 700/65 |
| 2002/0065701 A1* | 5/2002 | Kim et al. | 705/9 |
| 2003/0055931 A1* | 3/2003 | Cravo De Almeida et al. | 709/223 |
| 2003/0070053 A1* | 4/2003 | Gallo et al. | 711/170 |
| 2004/0093381 A1* | 5/2004 | Hodges et al. | 709/204 |
| 2004/0172221 A1* | 9/2004 | Curry, III | 702/186 |
| 2004/0267937 A1* | 12/2004 | Klemets | 709/227 |
| 2005/0044251 A1* | 2/2005 | Bozak et al. | 709/230 |
| 2005/0050069 A1* | 3/2005 | Vaschillo et al. | 707/100 |
| 2005/0055350 A1* | 3/2005 | Werme et al. | 707/10 |
| 2005/0055697 A1* | 3/2005 | Buco et al. | 718/105 |
| 2005/0069135 A1* | 3/2005 | Brickell | 380/277 |
| 2005/0114502 A1* | 5/2005 | Raden et al. | 709/224 |
| 2005/0193005 A1* | 9/2005 | Gates et al. | 707/104.1 |
| 2005/0262187 A1* | 11/2005 | Klemets | 709/203 |
| 2006/0005000 A1* | 1/2006 | King et al. | 713/1 |
| 2006/0106761 A1* | 5/2006 | Sarangam | 707/3 |
| 2006/0117300 A1* | 6/2006 | Puthukattukaran et al. | 717/124 |
| 2006/0143314 A1* | 6/2006 | Sinha et al. | 710/5 |
| 2006/0143493 A1* | 6/2006 | Meis et al. | 714/4 |
| 2006/0242471 A1* | 10/2006 | Vadnais et al. | 714/47 |
| 2009/0307687 A1* | 12/2009 | Nevarez et al. | 718/1 |

OTHER PUBLICATIONS

Int'l Preliminary Report with Written Opinion for PCT Patent Application No. PCT/CN2005/000579 mailed Nov. 2, 2007, 6 pgs.

* cited by examiner

METHOD AND SYSTEM FOR A PROCESS MONITOR USING A HARDWARE COMMUNICATION FORMAT

CROSS-REFERENCE TO RELATED APPLICATION

This application is a National Phase Application of, and claims priority to, International Application No. PCT/CN2005/000579, filed Apr. 27, 2005, entitled Method and System for a Process Monitor Using a Hardware Communication Format.

TECHNICAL FIELD

Embodiments of the invention relate to process monitoring, and more specifically to a process monitor using a hardware communication format and a hardware device.

BACKGROUND

A typical process monitor runs in the background and scans the system process table periodically for expected and unexpected processes. The server checks the status of the process monitor in the client operating system (OS) periodically. If the process monitor is down, the server gives a warning and tries to manage the client with one or more software methods, such as rebooting the client. There are several problems with this approach. The pure software-based implementation is heavily dependent on the client OS. If there is a problem with the OS, such as being hung or infected by a virus, then any software operations on the OS will fail. Another problem is that there is no standard interface to address the monitoring problem, even though it may be desirable for the monitoring feature to be integrated into different management systems.

BRIEF DESCRIPTION OF THE DRAWINGS

The invention is illustrated by way of example, and not by way of limitation, in the figures of the accompanying drawings in which like reference numerals refer to similar elements.

DETAILED DESCRIPTION

Embodiments of a system and method for a process monitor using a hardware communication format are described. In the following description, numerous specific details are set forth. However, it is understood that embodiments of the invention may be practiced without these specific details. In other instances, well-known circuits, structures and techniques have not been shown in detail in order not to obscure the understanding of this description.

Reference throughout this specification to "one embodiment" or "an embodiment" means that a particular feature, structure, or characteristic described in connection with the embodiment is included in at least one embodiment of the invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
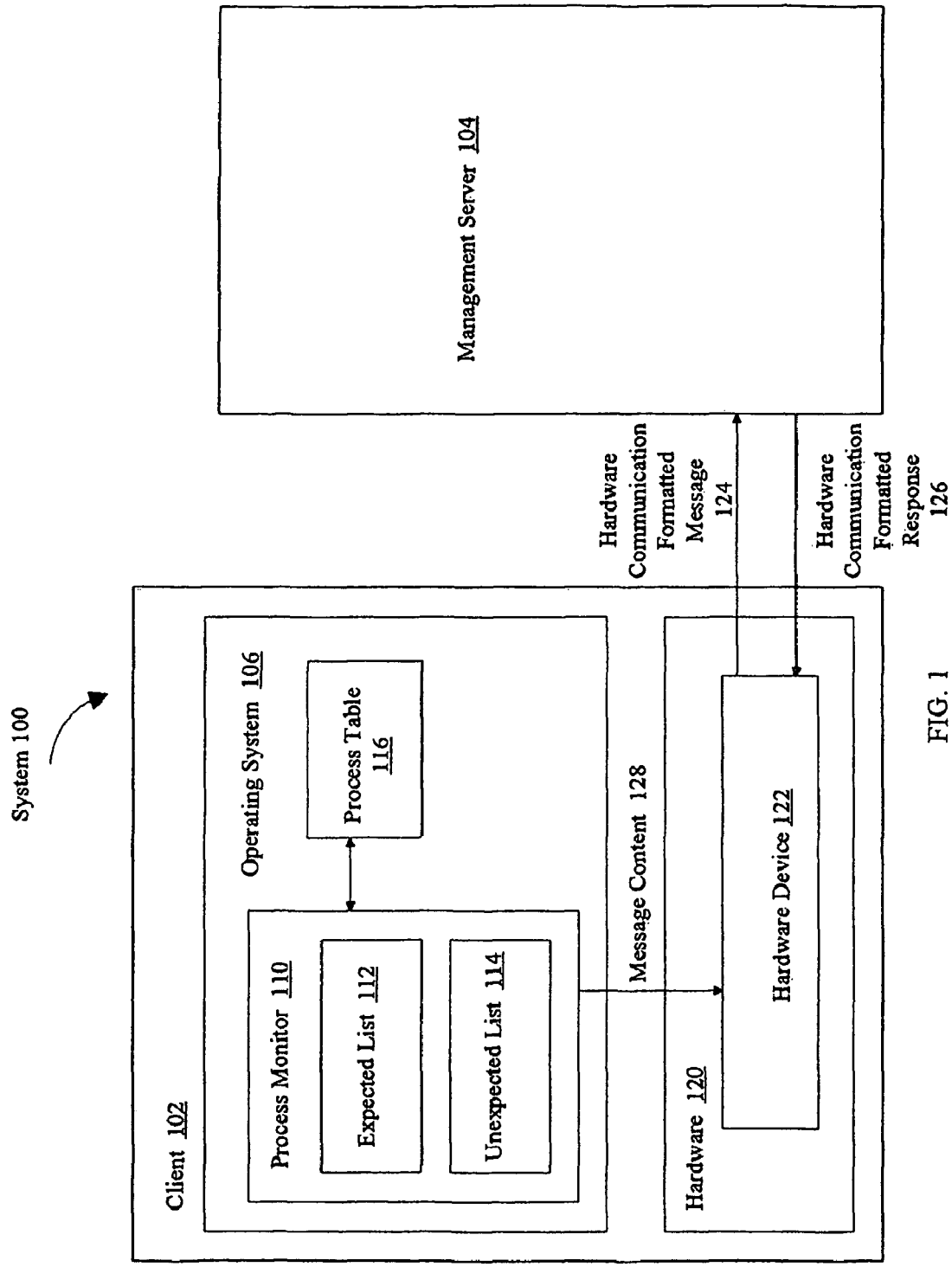
FIG. 1 is a block diagram illustrating a system according to one embodiment of the invention.

Referring to FIG. 1, a block diagram illustrates a system 100 according to one embodiment of the invention. Those of ordinary skill in the art will appreciate that the system 100 may include more components than those shown in FIG. 1. However, it is not necessary that all of these generally conventional components be shown in order to disclose an illustrative embodiment for practicing the invention.

System 100 includes a client apparatus 102 and a management server 104. The client apparatus 102 includes an operating system 106. One or more processes may be running on the operating system 106. Information about these processes are maintained in a process table 116. A process monitor 110 scans the process table 116 periodically and monitors processes running on the operating system 106. The process monitor 110 maintains an expected processes list 112 and an unexpected processes list 114. The hardware 120 in the client apparatus includes a hardware device 122. The hardware device 122 sends and receives messages in a hardware communication format and executes commands accordingly. These messages are processed by hardware instead of by the operating system. In one embodiment, the hardware communication format is an Advanced Systems Format (ASF) or Active Management Technology (AMT) format.

When an expected process is not running on the operating system, a message may be sent to the management server 104 indicating the possible problem. In addition, the expected process may be launched. When an unexpected process is running on the operating system, a message may be sent to the management server 104 indicating the possible problem. In addition, the unexpected process may be terminated. These messages are formatted in the hardware communication format. The message content 128 is sent from the process monitor 110 to the hardware device 122. The hardware device 122 then assembles the message and sends the message in the hardware communication format to the management server 104. When the management server 104 receives the hardware communication formatted message 124, it may send a response 126 that is also formatted in the hardware communication format. The response 126 may indicate an action to be performed on the client apparatus 102. The client hardware device 122 would receive the response 126 and execute it.

In one embodiment, the hardware device 122 also sends a periodic status message to the management server 102. This status message indicates the current status of the process monitor 110 and is also formatted in the hardware communications format.

By analyzing the messages received from the client apparatus, the management server 104 may then determine if there is a problem with the process monitor, operating system, or client apparatus that requires some further action. For example, if the management server does not receive the periodic status message from the client apparatus for a predetermined period of time, this may indicate that the process monitor is down, and the management server may perform an emergency action on the client, such as triggering an alert or rebooting the client apparatus.

If the management server 104 wants to perform an action on the client apparatus 102, it may send a command to the client apparatus. The command is formatted in the hardware communication format. Some examples of actions or commands that may be sent from the management server to the client apparatus include but are not limited to resetting the client, shutting down the client, having the client boot from another device (such as a CD-ROM), checking the state of the processor, and checking the state of one or more sensors to see if there is a problem with the memory or hard disk.

Figure 2:
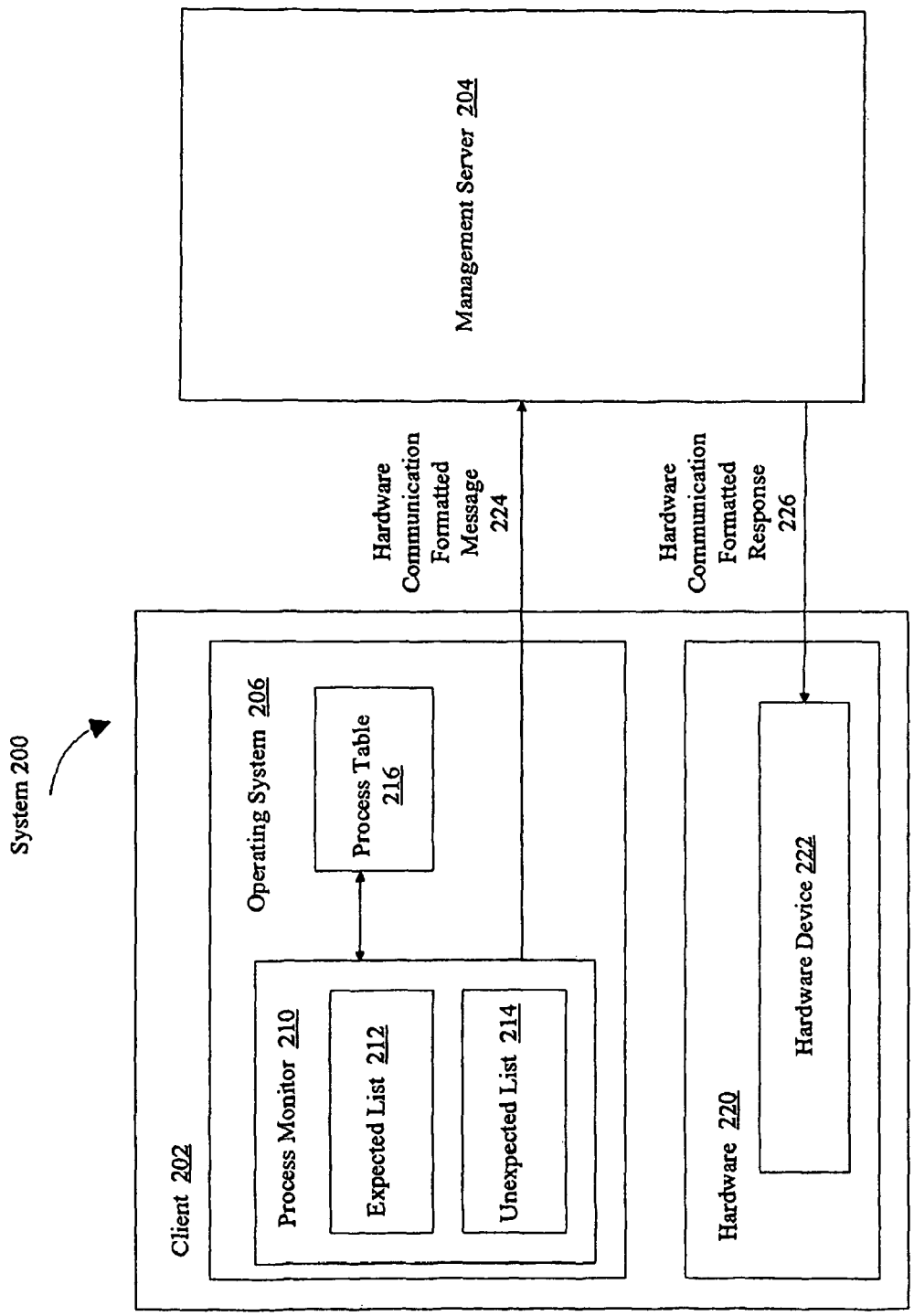
FIG. 2 is a block diagram illustrating a system according to one embodiment of the invention.

FIG. 2 illustrates a system 200 according to one embodiment of the invention. Similar to system 100, system 200 includes a client apparatus 202 and a management server 204. The client apparatus 202 includes hardware 220 and an operating system 206 on which is running a process monitor 210. The process monitor 210 scans the process table 216 periodically and also maintains an expected process list 212 and an unexpected process list 214. Unlike system 100, the process monitor 210 in system 200 sends its own messages 224 to the management server 204. The process monitor emulates hardware and formats these messages 224 in the hardware communication format. Responses 226 are sent by the management server 204 to the hardware device 222. As described above with respect to FIG. 1, these responses may indicate actions to be performed on the client apparatus 202 and are formatted in the hardware communication format.

Figure 3:
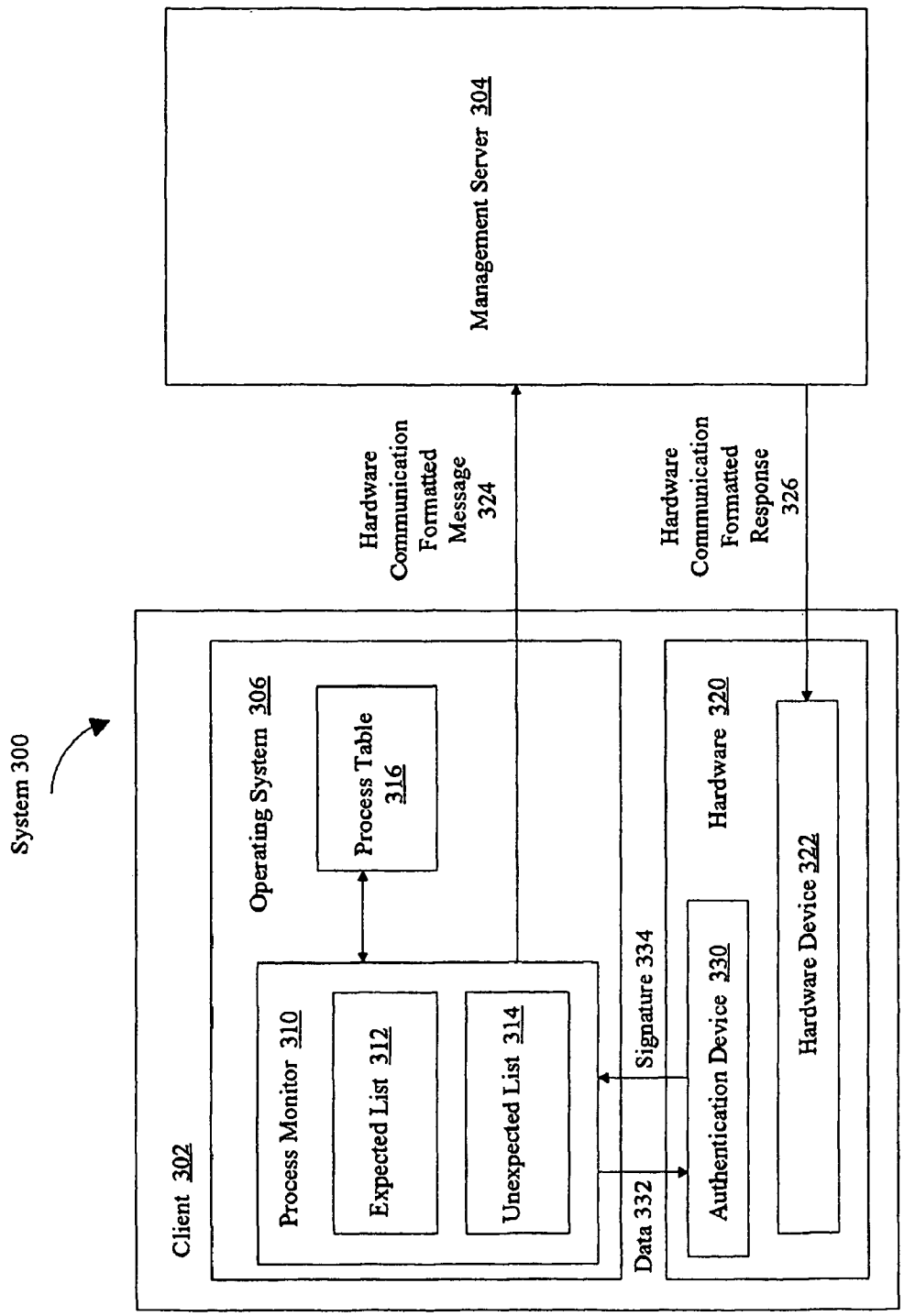
FIG. 3 is a block diagram illustrating a system according to one embodiment of the invention.

FIG. 3 illustrates a system 300 using authentication according to one embodiment of the invention. Similar to system 200, system 300 includes a client apparatus 302 and a management server 304. The client apparatus 302 includes hardware 320 and an operating system 306 on which is running a process monitor 310. The process monitor 310 scans the process table 316 periodically and also maintains an expected process list 312 and an unexpected process list 314. Messages 324 in the hardware communication format are sent from the process monitor 310 to the management server 304. Responses 326 are sent by the management server 304 to the hardware device 322.

The hardware 320 in the client apparatus 302 also includes an authentication device 330 that provides authentication information for messages sent by the client apparatus. In one embodiment, when the process monitor 310 wants to send a message 324 to the management server 304, the process monitor 310 may provide the authentication device 330 with authentication data 332. The authentication device 330 may then compute a signature 334 to be included in the message 324 to authenticate the client apparatus 302 to the management server 304. In one embodiment, the authentication device 330 is a Trusted Protection Module (TPM).

Figure 4:
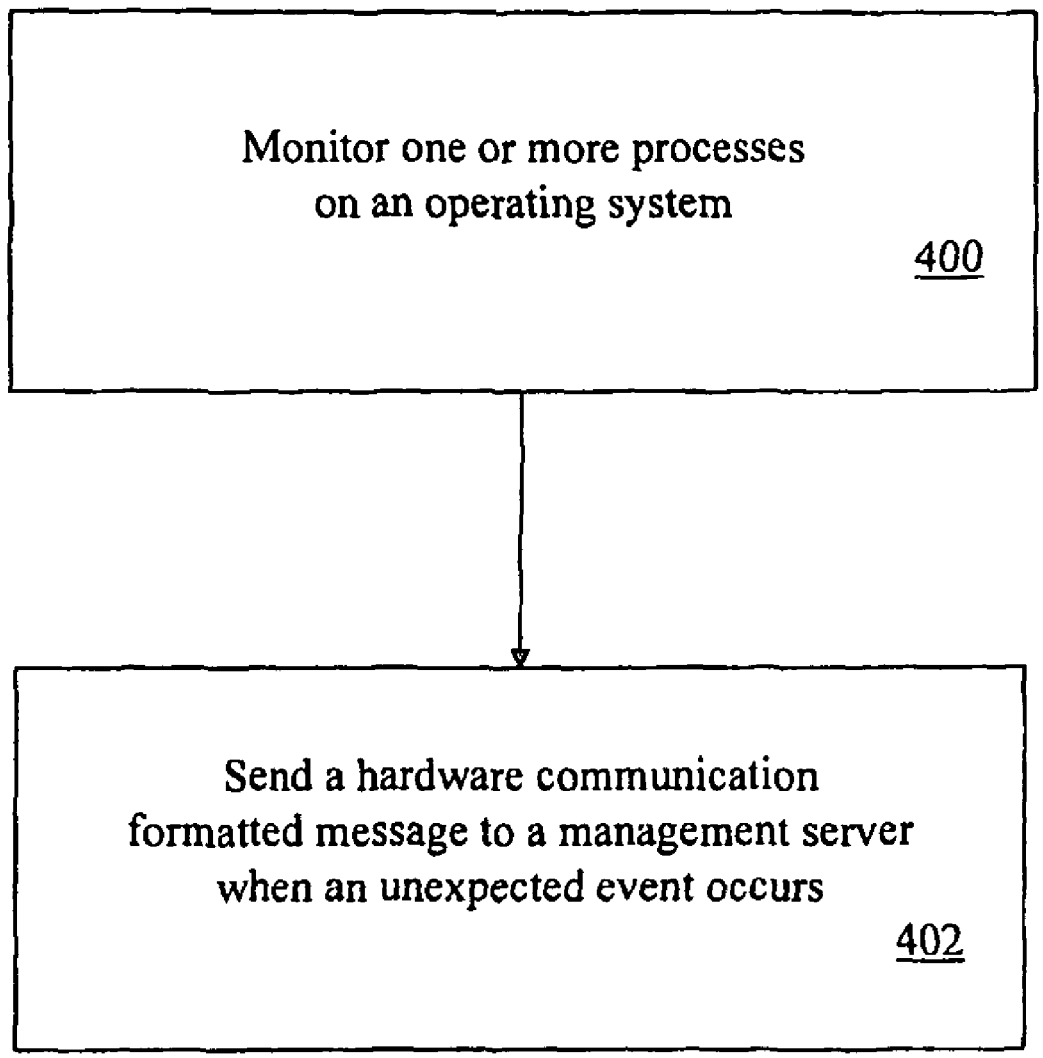
FIG. 4 is a flow diagram illustrating a method according to an embodiment of the invention.

FIG. 4 illustrates a method according to one embodiment of the invention. At 400, one or more processes on an operating system are monitored via a process monitor. At 402, a hardware communication formatted message is sent to a management server when an unexpected event occurs. The message may be sent by the process monitor or by a hardware device. Examples of an unexpected event include the process monitor scanning the process table and determining that an expected process is not running or an unexpected process is running. When the unexpected event occurs, the process monitor may perform an action, such as terminating an unexpected process or launching an expected process.

Periodic status messages may also be sent to the management server to indicate the status of the process monitor. In one embodiment, the messages sent to the management server may include a signature for authentication. This signature may be computed by a hardware authentication device. A hardware communication formatted response may be received from the management server indicating an action to be performed. For example, the management server may send a response that includes a command to reboot.

Figure 5:
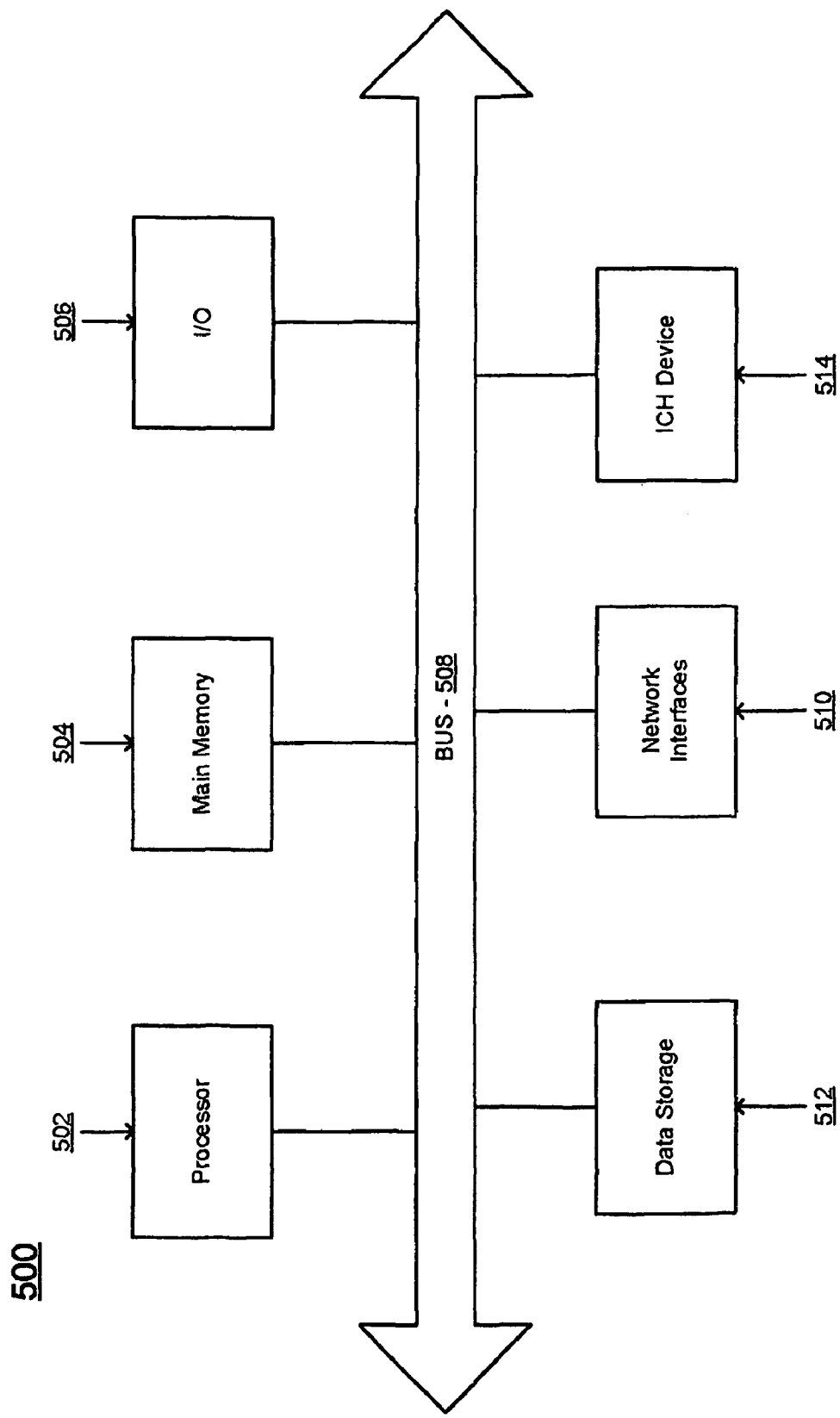
FIG. 5 is a block diagram illustrating a suitable computing environment in which certain aspects of the illustrated invention may be practiced.

FIG. 5 is a block diagram illustrating a suitable computing environment in which certain aspects of the illustrated invention may be practiced. In one embodiment, the method described above may be implemented on a computer system 500 having components 502-514, including a processor 502, a memory 504, an Input/Output (I/O) device 506, a data storage device 512, a network interface 510, and an I/O Controller Hub (ICH) device 514, coupled to each other via a bus 508. The components perform their conventional functions known in the art and provide the means for implementing the system 100. Collectively, these components represent a broad category of hardware systems, including but not limited to general purpose computer systems, mobile or wireless computing systems, and specialized packet forwarding devices. It is to be appreciated that various components of computer system 500 may be rearranged, and that certain implementations of the present invention may not require nor include all of the above components. Furthermore, additional components may be included in system 500, such as additional processors (e.g., a digital signal processor), storage devices, memories (e.g. RAM, ROM, or flash memory), and network or communication interfaces.

As will be appreciated by those skilled in the art, the content for implementing an embodiment of the method of the invention, for example, computer program instructions, may be provided by any machine-readable media which can store data that is accessible by system 100, as part of or in addition to memory, including but not limited to cartridges, magnetic cassettes, flash memory cards, digital video disks, random access memories (RAMs), read-only memories (ROMs), and the like. In this regard, the system 100 is equipped to communicate with such machine-readable media in a manner well-known in the art.

It will be further appreciated by those skilled in the art that the content for implementing an embodiment of the method of the invention may be provided to the system 100 from any external device capable of storing the content and communicating the content to the system 100. For example, in one embodiment of the invention, the system 100 may be connected to a network, and the content may be stored on any device in the network.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting.

What is claimed is:

1. A method comprising:
   monitoring, with a process monitor, one or more processes on an operating system, wherein monitoring one or more processes comprises maintaining an expected processes list and an unexpected processes list;
   sending, with the process monitor, a first message to a management server in a hardware communication format when a process from the expected process list is not running on the operating system, wherein the message is authenticated by a Trusted Platform Module (TPM);
   launching the process from the expected process list in response to detection that the process from the expected process list is not running on the operating system;
   sending, with the process monitor, a second message to the management server in the hardware communication format when a process from the unexpected process list is running on the operating system, wherein the message is authenticated by the TPM;

terminating the process from the unexpected process list in response to detection that the process from the unexpected process list is running on the operating system; and receiving a response in the hardware communication format from the management server to indicating an action to be taken with respect to the unexpected event.

2. The method of claim 1, further comprising terminating the unexpected process.

3. The method of claim 1, wherein sending a message to a management server comprises sending a message to a management server via a hardware device.

4. The method of claim 1, wherein sending a message to a management server comprises sending a message to a management server via a process monitor.

5. The method of claim 1, further comprising sending a periodic status message to the management server to report a status of the process monitoring.

6. The method of claim 1, further comprising computing a signature for authentication via a hardware authentication device.

7. The method of claim 6, wherein sending a message to a management server comprises sending a message to a management server that includes the computed signature.

8. The method of claim 1, further comprising receiving a response from the management server, wherein the response is in the hardware communication format.

9. The method of claim 1 wherein the hardware communication format comprises Advanced Systems Format (ASF).

10. The method of claim 1 wherein the hardware communication format comprises Active Management Technology (AMT).

11. An article of manufacture comprising:
a machine accessible medium including content that when accessed by a machine causes the machine to perform operations including:
monitoring, with a process monitor, one or more processes on an operating system, wherein monitoring one or more processes comprises maintaining an expected processes list and an unexpected processes list;
sending, with the process monitor, a first message to a management server in a hardware communication format when a process from the expected process list is not running on the operating system, wherein the message is authenticated by a Trusted Platform Module (TPM);
launching the process from the expected process list in response to detection that the process from the expected process list is not running on the operating system;
sending, with the process monitor, a second message to the management server in the hardware communication format when a process from the unexpected process list is running on the operating system, wherein the message is authenticated by the TPM;
terminating the process from the unexpected process list in response to detection that the process from the unexpected process list is running on the operating system; and
receiving a response in the hardware communication format from the management server to indicating an action to be taken with respect to the unexpected event.

12. The article of manufacture of claim 11, wherein the machine-accessible medium further includes content that causes the machine to perform operations comprising sending one or more messages to the management server to provide a status of one or more of the processes.

13. The article of manufacture of claim 12, wherein messages are sent to the management server via the process monitor.

14. The article of manufacture of claim 12, wherein messages are sent to the management server via a hardware device coupled to the process monitor.

15. The article of claim 11 wherein the hardware communication format comprises Advanced Systems Format (ASF).

16. The article of claim 11 wherein the hardware communication format comprises Active Management Technology (AMT).

* * * * *